(12) United States Patent
Zhuo et al.

(10) Patent No.: US 10,705,742 B2
(45) Date of Patent: Jul. 7, 2020

(54) MANAGING INPUT/OUTPUT (I/O) CONCURRENCY NUMBERS TO CONTROL STORAGE SYSTEM RESPONSES

(71) Applicant: EMC IP Holding Company LLC, Hopkinton, MA (US)

(72) Inventors: Baote Zhuo, Beijing (CN); Jian Gao, Beijing (CN); Jibing Dong, Beijing (CN); Geng Han, Beijing (CN); Xinlei Xu, Beijing (CN); Jianbin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/216,320

(22) Filed: Dec. 11, 2018

(65) Prior Publication Data

US 2019/0332286 A1    Oct. 31, 2019

(30) Foreign Application Priority Data

Apr. 28, 2018  (CN) .......................... 2018 1 0397867

(51) Int. Cl.
*G06F 13/00*    (2006.01)
*G06F 3/06*    (2006.01)

(52) U.S. Cl.
CPC ............ *G06F 3/0622* (2013.01); *G06F 3/061* (2013.01); *G06F 3/0629* (2013.01); *G06F 3/0689* (2013.01)

(58) Field of Classification Search
CPC ...... G06F 3/0622; G06F 3/0689; G06F 3/061; G06F 3/0629
See application file for complete search history.

(56) References Cited

U.S. PATENT DOCUMENTS

| | | | | |
|---|---|---|---|---|
| 3,702,006 A | * | 10/1972 | Page ................... | G06F 11/3404 718/105 |
| 5,548,711 A | * | 8/1996 | Brant .................. | G06F 11/1076 711/114 |
| 6,073,218 A | * | 6/2000 | DeKoning ................ | G06F 9/52 710/20 |
| 6,457,098 B1 | * | 9/2002 | DeKoning .............. | G06F 3/061 711/114 |
| 8,327,103 B1 | | 12/2012 | Can et al. | |
| 9,513,829 B1 | | 12/2016 | Wang et al. | |
| 9,727,472 B2 | * | 8/2017 | Madhusudana ..... | G06F 12/0866 |
| 9,934,172 B1 | | 4/2018 | Koli et al. | |
| 10,140,041 B1 | | 11/2018 | Dong et al. | |
| 10,210,045 B1 | | 2/2019 | Gao et al. | |
| 10,402,104 B2 | | 9/2019 | Yang et al. | |

(Continued)

*Primary Examiner* — Jing-Yih Shyu
(74) *Attorney, Agent, or Firm* — BainwoodHuang

(57) ABSTRACT

Techniques manage a storage system. Such techniques involve: determining an expected input/output (I/O) concurrency number of an access request for a storage system, the access request being associated with a first one of a plurality of redundant arrays of independent disks (RAIDs) comprised in the storage system; in response to a current available I/O concurrency number of the first RAID being less than the expected I/O concurrency number, increasing the available I/O concurrency number of the first RAID based on a reserved I/O concurrency number of the storage system; and performing the access request using the first RAID having the increased available I/O concurrency number.

20 Claims, 4 Drawing Sheets

(56) References Cited

U.S. PATENT DOCUMENTS

| | | |
|---|---|---|
| 10,503,644 B2 | 12/2019 | Xu et al. |
| 2012/0278668 A1* | 11/2012 | Chiu ................. G06F 12/02 |
| | | 714/700 |

* cited by examiner

MANAGING INPUT/OUTPUT (I/O) CONCURRENCY NUMBERS TO CONTROL STORAGE SYSTEM RESPONSES

FIELD

Embodiments of the present disclosure relate to the field of storage management, and more specifically to a method, apparatus and a computer program product for managing a storage system.

BACKGROUND

As data storage technologies develop, various data storage devices are already able to provide users with an increasingly higher data storage capability, and a data access speed is improved to a very large extent. While the data storage capability is improved, users raise increasingly higher requirements for data reliability and response time of the storage system.

At present, more and more storage systems use a redundant array of independent disks (RAID) to provide storage with data redundancy. In a conventional solution, when a storage system includes a plurality of RAIDs, a maximum I/O concurrency number that may be executed by each RAID is typically fixed. When some RAIDs have more access requests whereas other RAIDs are relatively free, the phenomenon of load imbalance occurs between RAIDs. In this case, it is difficult to efficiently respond to the user's access requests. Hence, how to manage RAIDs to improve the overall system efficiency becomes a focus of concern.

SUMMARY

Embodiments of the present disclosure provide a solution of managing a storage system.

According to a first aspect of the present disclosure, there is provided a method of managing a storage system. The method includes: determining an expected input/output (I/O) concurrency number of an access request for a storage system, the access request being associated with a first one of a plurality of redundant arrays of independent disks (RAIDs) of the storage system; in response to a current available I/O concurrency number of the first RAID being less than the expected I/O concurrency number, increasing the available I/O concurrency number of the first RAID based on a reserved I/O concurrency number of the storage system; and performing the access request using the first RAID having the increased available I/O concurrency number.

According to a second aspect of the present disclosure, there is provided an apparatus for managing a storage system. The apparatus includes: at least one processing unit; and at least one memory. The at least one memory is coupled to the at least one processing unit and stores instructions for execution by the at least one processing unit. The instructions, when executed by the at least one processing unit, cause the apparatus to perform acts including: determining an expected input/output (I/O) concurrency number of an access request for a storage system, the access request being associated with a first one of a plurality of redundant arrays of independent disks (RAIDs) comprised in the storage system; in response to a current available I/O concurrency number of the first RAID being less than the expected I/O concurrency number, increasing the available I/O concurrency number of the first RAID based on a reserved I/O concurrency number of the storage system; and performing the access request using the first RAID having the increased available I/O concurrency number.

According to a third aspect of the present disclosure, there is provided a computer program product being stored in a non-transitory computer storage medium and including machine-executable instructions. The machine-executable instructions which, when executed by a device, cause the device to perform any step of the method described according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in various embodiments of the present disclosure.

DETAILED DESCRIPTION OF EMBODIMENTS

Figure 1:
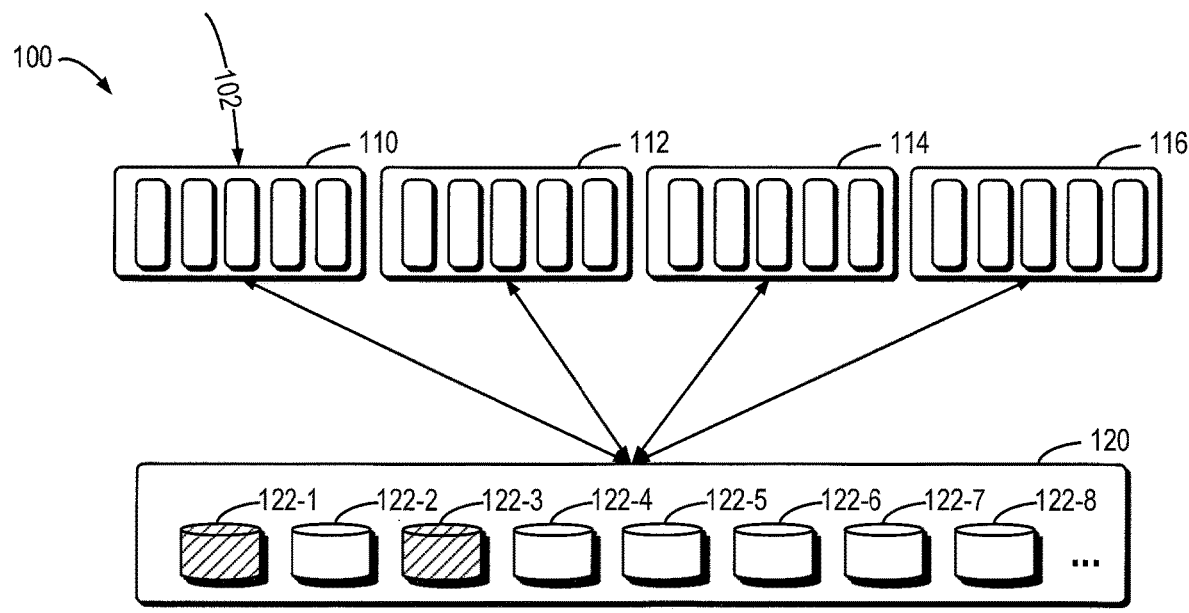
FIG. 1 illustrates a diagram of architecture of a storage system in which embodiments of the present disclosure may be implemented.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second"

and others can denote different or identical objects. The following text may also contain other explicit or implicit definitions.

As described above, a storage system often employs a redundant array of independent disks (RAID) technology to provide storage having data redundancy. FIG. 1 illustrates a storage system 100 in which embodiments of the present disclosure may be implemented. As shown in FIG. 1, the storage system 100 may include a storage device pool 120, wherein the storage device pool 120 may include a plurality of independent physical storage devices, e.g., storage devices 122-1 to 122-8 (collectively called or separately called storage device 122.) In some embodiments, a storage device 122 may be a hard disk drive (HDD), solid-state disk (SSD), a flash memory or the like.

Figure 2:
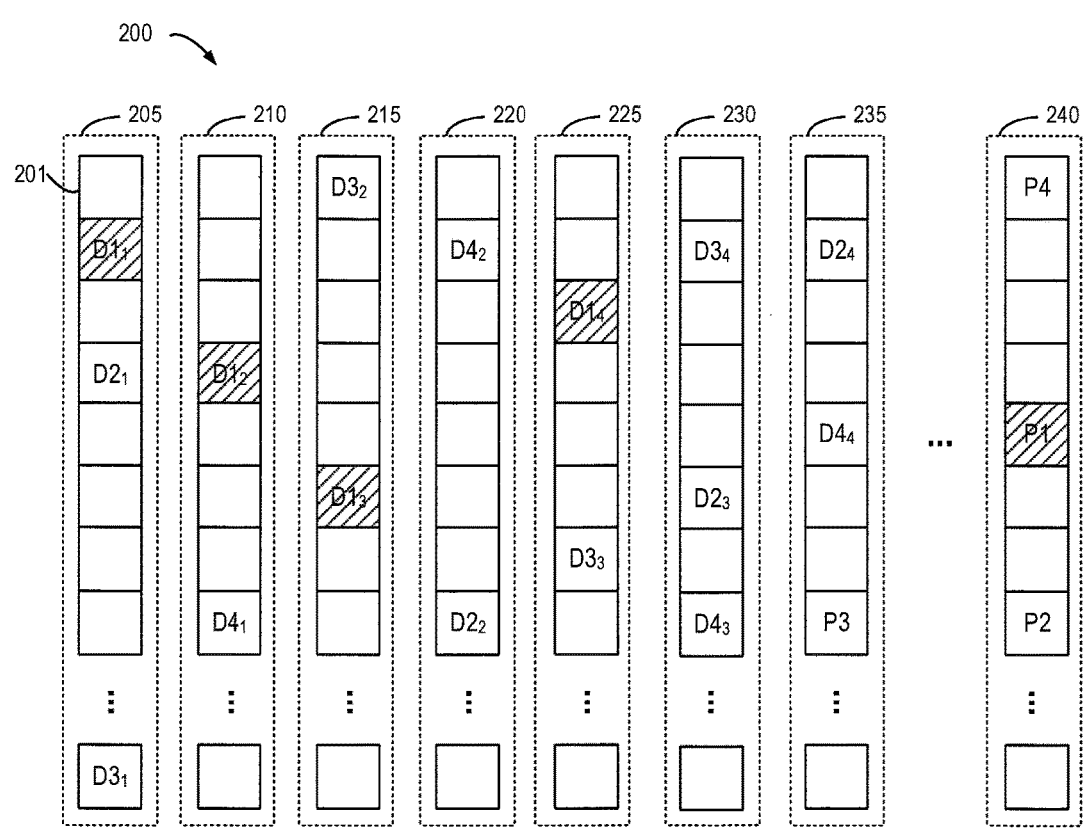
FIG. 2 illustrates a schematic diagram of an example structure of a mapped RAID according to embodiments of the present disclosure.

In some embodiments, the storage device pool 120 may be constructed as a plurality of redundant arrays of independent disks (RAIDs). As shown in FIG. 1, the storage device pool is constructed as four RAID-5 (4+1) arrays or configurations (e.g., RAIDs 110, 112, 114 and 116). It should be appreciated that the storage device pool 120 may also be constructed as one or more RAIDs of other versions. In some embodiments, a mapped RAID technology may be used to implement the plurality of RAIDs (e.g., RAIDs 110, 112, 114 and 116) shown in FIG. 1. For the purpose of understanding, FIG. 2 shows an example structure of a mapped RAID 200 according to an embodiment of the present disclosure. The RAID 200 in FIG. 2 may be implemented as any one of RAIDs 110, 112, 114 and 116 in FIG. 1.

Still take RAID-5 type as an example. As shown in FIG. 2, the mapped RAID-5, which is different from a conventional RAID-5 structure, may include N independent storage devices (205, 210, . . . 240), wherein N>5. In the mapped RAID-5, each storage device (205, 210, . . . 240) is organized as a plurality of continuous, none-overlapping, fix sized storage blocks 201. In this way, a plurality of physical storage devices are organized as a set of storage blocks. Therefore, in the mapped RAID-5 structure, it is only necessary to use part of the reserved storage blocks of all physical storage devices to provide a redundancy function, rather than to use the whole drive as a hot spare drive as in the conventional RAID-5 structure. As shown in FIG. 1, user data $D1_1$, $D1_2$, $D1_3$ and $D1_4$ in a same strip are stored in storage devices 205, 210, 215 and 225 respectively, and a parity P1 is stored in the storage device 240. In addition, a storage device 235 stores user data D24, D44 as well as parity P3.

Further referring to FIG. 1, in order to prevent the storage device 122 from failing to effectively respond to the request due to overload, a maximum I/O concurrency number of the storage device 122 is typically restrained. In some embodiments, the maximum I/O concurrency of the storage device 122 may be associated with a type of the storage device. For example, a flash memory may have a larger maximum I/O concurrency number than a hard disk drive. Correspondingly, the storage device pool may also have a maximum I/O concurrency number. Specifically, the maximum I/O concurrency number of the storage device pool is: a number of storage devices*the maximum concurrency number of a storage device. For example, if the storage device pool has 10 independent storage devices, the maximum I/O concurrency number of the storage device pool is 10 times the maximum I/O concurrency number of a storage device.

In addition, the maximum I/O concurrency number that can occur with each RAID may also be limited. Conventionally, the maximum I/O concurrency number that can occur with each RAID is generally fixed as: a width of RAID*the maximum I/O concurrency number of the storage device, wherein the width of RAID represents a number of virtual drives in the RAID. For example, regarding RAID-5, it includes five virtual drives, and its maximum I/O concurrency number is five times the maximum I/O concurrency number of a storage device.

The storage system 100 may include a computing device (not shown) which is configured to perform a management function, for managing access to RAIDs and the storage devices in the storage system 100. When the storage system 100 receives an access request 102, the storage system 100 may determine the I/O concurrency number required by the access request 102. For example, if the access request is a read request, it only needs to read data from one storage device, and the expected 110 concurrency number is 1. If the access request is a write request for the RAID, it needs not only to write data into a data area but also to write the parity, and the expected I/O concurrency number is 2.

The storage system 100 may determine a RAID (e.g., RAID 110) associated with the access request 102. The associated RAID 110 may be used to execute the access request 102. Typically, it may be determined whether the access request 102 may be executed immediately according to the I/O concurrency number that may be currently used by the RAID 110 and the expected I/O concurrency number of the access request 102. Specifically, the storage system 100 determines whether a sum of the currently-happening I/O concurrency number and the expected I/O concurrency number of the RAID 110 exceeds the maximum I/O concurrency number of the RAID 110. If the sum exceeds the maximum I/O concurrency number of the RAID 110, this indicates that the currently available I/O concurrency number of the RAID 110 is insufficient for performing the access request 102, and the access request 102 will be suspended, for example, by being added to a waiting queue. For example, assuming that the maximum I/O concurrency number of the RAID 110 is 20 and the currently already-happened I/O concurrency number is 19, the RAID may only support the access request with the expected I/O concurrency number 1 at this time, and the access request with the expected I/O concurrency number greater than 1 will be suspended.

If the sum does not exceed the maximum I/O concurrency number of the RAID 110, the storage system 100 may further determine whether a sum of the currently-happening I/O concurrency number and the expected I/O concurrency number of the storage device pool 120 exceeds a maximum I/O concurrency number. If the sum exceeds the maximum I/O concurrency number of the storage device pool 120, this indicates that the currently-available I/O concurrency number of the storage device pool 120 is insufficient for performing the access request 102, and the access request 102 will be suspended. If the sum does not exceed the maximum I/O concurrency number of the storage device pool 120, the storage system 100 may further determine whether one or more storage devices (storage devices 122-1 and 122-3 as shown in FIG. 1) associated with the access request already reach the maximum I/O concurrency number. If there is a storage device (e.g., storage device 122-3) that already reaches the maximum I/O concurrency number, this indicates that the storage device 122-3 is already fully-loaded and the access request 102 will be suspended. The access request 102 may be executed only when none of associated one or more storage devices reach the maximum I/O concurrency number.

According to a conventional storage system management solution, in the above process, the maximum I/O concurrency number of each RAID is fixed, and it only depends on the width of the RAID and the type of the storage device. However, in such solution, if less RAIDs are constructed only from the storage device pool, for example, only one RAID-5 is constructed from the storage device pool having 10 storage devices, the storages devices in the storage device pool cannot be used sufficiently at this time, as the RAID width 5 of the RAID-5 is less than the number 10 of the storage devices in the storage device pool. For example, if the maximum I/O concurrency number of a single storage device is 10, the maximum I/O concurrency number of the RAID-5 is 50. However, in fact, the corresponding storage devices may support a maximum of 100 I/O concurrency number. At this time, although the storage device may further support more access requests, some access requests cannot be effectively executed due to the limitation of the maximum I/O concurrency number of the RAID.

In addition, when a plurality of RAIDs are constructed from the storage device pool, load situation of each RAID might be different. However, since the maximum I/O concurrency number of each RAID is always fixed, there might be a situation that a certain RAID has a lot of pending access requests, whereas some RAIDs are relatively free, thereby causing the storage system to fail to effectively respond to the access request.

According to embodiments of the present disclosure, there is provided a solution for managing a storage system. In this solution, the plurality of RAIDs constructed from the storage device pool will have a fixed available I/O concurrency number, and additionally the storage device pool will reserve a certain amount of I/O concurrency number. When the I/O concurrency number in a certain RAID already reaches the fixed available I/O concurrency number, it is possible to apply for the I/O concurrency number reserved in the storage device pool, thereby implementing dynamic adjustment of the available I/O concurrency number of the plurality of RAIDs. The storage device may be sufficiently employed to improve the storage system's response to the access request.

Figure 3:
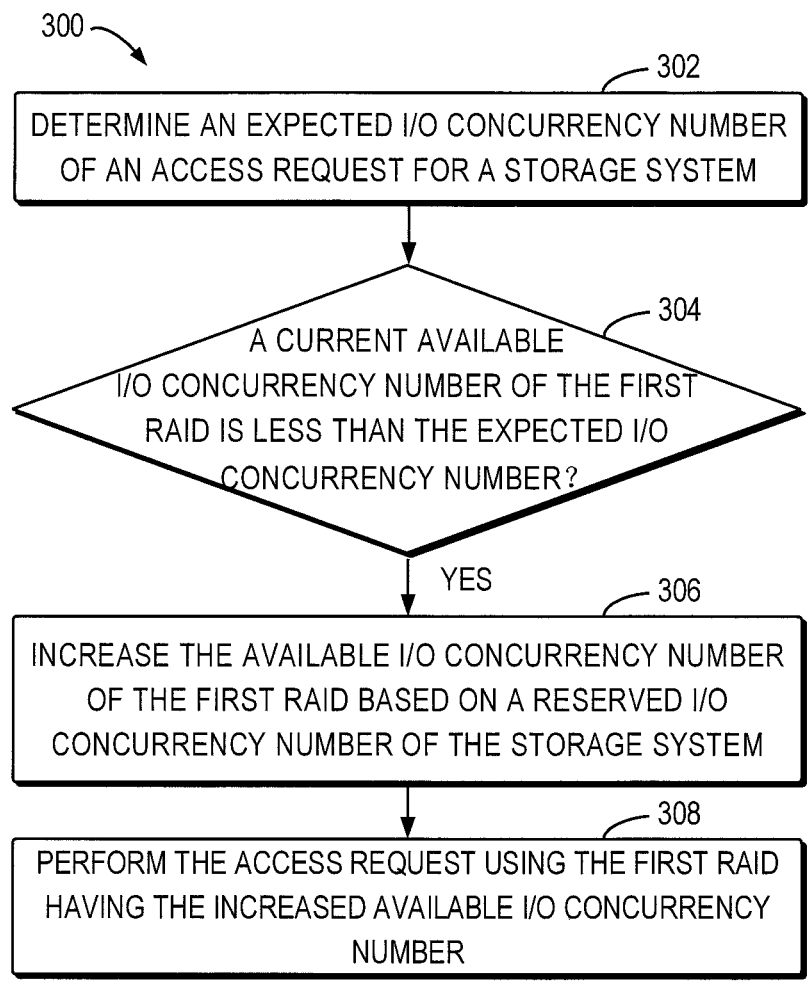
FIG. 3 illustrates a flow chart of a method of managing a storage system according to embodiments of the present disclosure.

FIG. 3 illustrates a flow chart of a method 300 of managing a storage system according to embodiments of the present disclosure. The method 300 may be implemented at the storage system 100, for example, may be implemented by a computing device configured for system management in the storage system 100. Acts involved in the method 300 will be described in conjunction with the storage system 100 shown in FIG. 1.

At 302, the storage system 100 determines an expected I/O concurrency number of the access request 102 for the storage system 100. The access request 102 is associated with one RAID (e.g., RAID 110) of a plurality of RAIDs (110, 112, 114 and 116) comprised in the storage system 100. For the purpose of description, the RAID 110 is hereinafter referred to as a first RAID 110. The access request 102 herein may be a new access request associated with the first RAID 110 received by the storage system 110. In some embodiments, the access request 102 may also be an access request which has been suspended in the first RAID 110.

The expected I/O concurrency number of the access request is at least related to a type of the access request 102, and a data amount to be read/written by the access request 102 and the like. As stated above, if the access request 102 is a read request, it only needs to read data from one storage device, and the expected I/O concurrency number is 1. If the access request is a write request for the RAID, it needs not only to write data into a data area but also to write the parity, and the expected I/O concurrency number is 2. If the access request 102 requests to access a larger amount of data (e.g., exceed a data quantity of one strip), its expected I/O concurrency number might be larger.

At 304, the storage system 100 determines whether the currently available I/O concurrency number of the first RAID 110 is less than the expected I/O concurrency number. In some embodiments, the storage system 100 may divide the maximum I/O concurrency number of the storage device pool 120 into two portions. The first portion is a fixed I/O concurrency number for the plurality of RAIDs (e.g., RAIDs 110, 112, 114 and 116) constructed by the storage device 120. The second portion is an I/O concurrency number reserved by the storage system 100, and the plurality of RAIDS (e.g., RAIDs 110, 112, 114 and 116) may dynamically apply for the reserved I/O concurrency number.

For example, take the storage device pool 120 (the maximum I/O concurrency number of a single storage device is 8) having 10 storage devices as example. The maximum I/O concurrency number of the storage device pool 120 is 80. In some embodiments, the storage system 100 may equally divide the maximum I/O concurrency number 80 into two portions. It should be appreciated that this division may be adjusted dynamically if required. The first portion of I/O concurrency number (80/2) is the I/O concurrency number fixed for RAIDs 110-116, wherein the fixed I/O concurrency number for each RAID is ten (40/4). In addition, the storage system 100 reserves 40 I/O concurrency number as a portion that may be dynamically applied for by the RAIDs 110-116. In such mechanism, each RAID will have the maximum I/O concurrency number of at least 10, and in an extreme case, a single RAID may occupy the reserved 40 I/O concurrency number and then the single RAID will have at most 50 I/O concurrency number. Such allocation mechanism may improve flexibility of the RAID bearing a load and increase the speed of responding to the access request.

In some embodiments, the storage system 100 may first determine the currently-happening I/O concurrency number of the first RAID 110, and then determine the currently available I/O concurrency number of the first RAID 110 according to a difference of the fixed I/O concurrency number and the currently-happening I/O concurrency number.

At 306, in response to determining that the currently available I/O concurrency number of the first RAID 110 is less than the expected I/O concurrency number, the storage system 100 increases the available I/O concurrency number of the first RAID 110 based on the reserved I/O concurrency number of the storage system.

In some embodiments, increasing the available I/O concurrency number of the first RAID may include: S11: comparing the reserved I/O concurrency number with the expected I/O concurrency number; S12: in response to determining that the reserved I/O concurrency number is not less than the expected I/O concurrency number, subtracting the expected I/O concurrency number from the reserved I/O concurrency number of the storage system; and S13: increasing the available I/O concurrency number of the first RAID by the expected I/O concurrency number.

For example, an example is taken in which the access request 102 is a write request (its expected I/O concurrency number is 2). The storage system 100 determines whether the reserved I/O concurrency number is greater than or equal to the expected I/O concurrency number. If yes, the storage system 100 may subtract a difference 2 from the reserved I/O concurrency number, and add the available I/O concurrency number of the first RAID 110 by 2, thereby supporting execution of the access request 102. If the current reserved I/O concurrency number of the storage system 100 is less than the expected I/O concurrency number (2), this indicates that the storage system 100 does not have enough I/O concurrency number, and the access request 102 will be suspended, e.g., by being added to the access request waiting queue of the first RAID 110. Based on such allocation manner, the storage system 100 may use the reserved I/O concurrency number to provide a response to an access request for a RAID with a larger load, preventing from failing to respond in time to some access requests due to the limitation of the RAID maximum I/O concurrency number.

In some embodiments, increasing the available I/O concurrency number of the first RAID may further include: S11: determining a difference between the expected I/O concurrency number and the available I/O concurrency number; S12: comparing the reserved I/O concurrency number with the difference; S13: in response to determining that the reserved I/O concurrency number is not less than the difference, subtracting the difference from the reserved I/O concurrency number of the storage system; and S14: increasing the available I/O concurrency number of the first RAID by the difference.

For example, an example is taken in which the access request 102 is a write request (its expected I/O concurrency number is 2). It is assumed that that the currently available I/O concurrency number of the first RAID 110 is 1, namely, the difference of the expected concurrency number and the available I/O concurrency value is 1. At this time, the storage system 100 may further determine whether the current reserved I/O concurrency number of the storage system 100 is larger than or equal to the difference 1. If yes, the storage system 100 may subtract the difference 1 from the reserved I/O concurrency number, and add the available I/O concurrency number of the first RAID 110 by 1, thereby supporting execution of the access request 102. If the current reserved I/O concurrency number of the storage system 100 is less than the difference 1, this indicates that the storage system 100 does not have an enough I/O concurrency number, and the access request 102 will be suspended, e.g., by being added to the access request waiting queue of the first RAID 110. Based on such allocation manner, the storage system 100 may more schedule the fixed I/O concurrency number and the reserved I/O concurrency number in a more flexible manner.

At 308, the storage system 100 perform the access request 102 using the first RAID 110 having the increased I/O concurrency number. In some embodiments, the storage system 100 further determines whether a storage device associated with the access request 102 in the first RAID 110 reaches a PO concurrency number upper limit. For example, as shown in FIG. 1, regarding the access request 102, its associated storage devices are storage device 122-1 and storage device 122-3. When it is determined that any one of the associated storage device 122-1 and storage device 122-3 reaches the I/O concurrency number upper limit (e.g., the maximum 110 concurrency number which may be supported), this means that the storage device is already fully loaded. At this time, the storage system 100 will suspend the access request 102, and maintain the available I/O concurrency number of the first RAID 110, namely, return the concurrency number allocated from the reserved I/O concurrency number. On the contrary, if it is determined that neither of the associated storage device 122-1 and storage device 122-3 reach the I/O concurrency number upper limit, the access request 102 will be executed.

It should be appreciated that if the storage system 100 determines that the currently available I/O concurrency number of the first RAID 110 is not less than the expected I/O concurrency number, the access request 102 may be executed. The currently available I/O concurrency number of the storage device will then be determined. This is similar to the above-described conventional method and will not be detailed any more here.

After the access request is executed, depending on a specific situation, the I/O concurrency number occupied by the first RAID 110 may be released to the fixed I/O concurrency number of the RAID or the reserved I/O concurrency number of the storage system 100.

Figure 4:
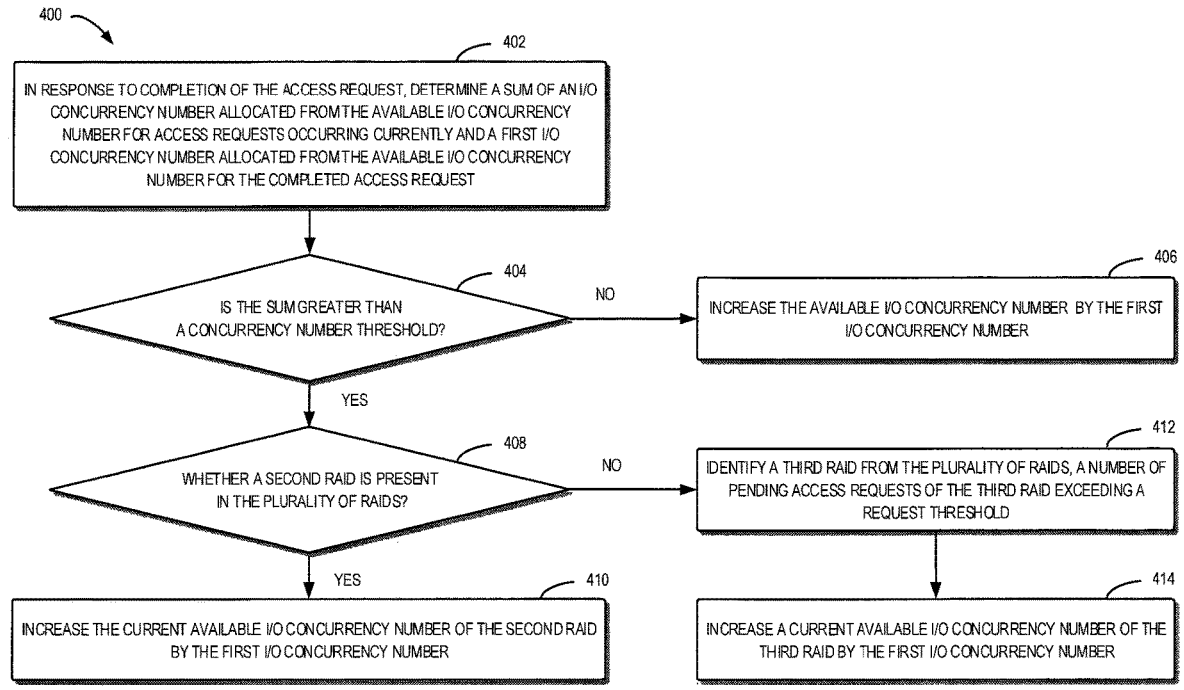
FIG. 4 illustrates a flow chart of a method of releasing input/output (I/O) concurrency number according to embodiments of the present disclosure.

FIG. 4 illustrates a method 400 of releasing I/O concurrency number according to embodiments of the present disclosure. According to an embodiment of the method 400, the fixed I/O concurrency number of RAID may be released such that the available I/O concurrency number for other RAIDs may be increased correspondingly. The method 400 may be implemented at the storage system 100, for example, implemented by a computing device responsible for system management in the storage system 100. Acts involved in the method 400 will be described in conjunction with the storage system 100 shown in FIG. 1.

At 402, in response to completion of the access request 102, the storage system 100 determines a sum of an I/O concurrency number allocated from the available I/O concurrency number of the first RAID 110 for access requests occurring currently and the first I/O concurrency number allocated from the I/O concurrency number for the completed access requests. In some embodiments, the storage system 100 may determine the I/O concurrency number allocated from the fixed I/O concurrency number of the first RAID 110 for access requests occurring currently. For example, the fixed I/O concurrency number of the first RAID 110 is 10. When the execution of the access 102 is completed, the first RAID 110 still has 12 I/O of other access requests occurring concurrently, wherein 9 I/O concurrency numbers are allocated from the fixed I/O concurrency number of the first RAID 110, whereas other 3 I/O concurrency numbers are allocated from the reserved I/O concurrency number of the storage system 100. In some embodiments, when the access request 102 is executed, the storage system 100 may record a portion of fixed I/O concurrency number of the first RAID 110 used by execution of the access request 102 and a portion of reserved I/O concurrency number of the storage system 100. For example, regarding the write access request 102, assuming that one of two I/O concurrency numbers required for execution is from the fixed I/O concurrency number of the first RAID 110 and the other is from the reserved I/O concurrency number of the storage system 100, the first I/O concurrency number is 1.

At 404, the storage system 100 compares the sum with a concurrency number threshold, to determine whether the sum is greater than the concurrency number threshold, wherein the concurrency number threshold is at least based on a number of RAIDs in the storage system and the number of storage devices in the storage system 100. In some embodiments, the concurrency number threshold may be obtained by dividing a half of the maximum I/O concurrency number of the storage device pool 120 by the number of RAIDs in the storage system 100. For example, when the maximum I/O concurrency number of the storage device pool 120 is 80, the concurrency number threshold may be set as: 80/2/4=10, wherein the maximum I/O concurrency number is 80, half of the maximum I/O concurrency number is 80/2, and the number of RAIDs in the storage system 100 is 4, resulting in a concurrency number threshold equal to 10. In some embodiments, when the user performs an operation of adding and/or deleting RAID to/from the storage system, the concurrent number threshold will be dynamically modified. For example, when the user configures a new RAID to the storage system 100, the concurrency number threshold will be set as: 80/2/5=8, wherein the maximum I/O concurrency number is 80, half of the maximum I/O concurrency number is 80/2, and the updated number of RAIDs in the storage system 100 is 5, resulting in a concurrency number threshold equal to 8. By setting the concurrency number threshold, the storage system 100 may ensure that each RAID possesses the same number of fixed I/O concurrency number, such that each RAID may at least support a certain number of I/O concurrency.

If it is determined at 404 that the sum is less than or equal to the concurrency number threshold, the method 400 proceeds to 406, i.e., the storage system 100 increases the available I/O concurrency number of the first RAID 110 by the first I/O concurrency number. In some embodiments, the storage system 100 may further wake up the pending access requests in the first RAID 110. If it is determined at 404 that the sum is greater than the concurrency number threshold, the method 400 proceeds to 408, namely, the storage system 100 determines whether a second RAID is present in the plurality of RAIDs, wherein the second RAID has an I/O concurrency number currently occurring therein less than the concurrency number threshold and the second RAID has a pending access request.

If it is determined at 408 that the second RAID is present in the plurality of RAIDs, the method 400 proceeds to 410, namely, the storage system 100 increases the available I/O concurrency number of the second RAID by the first I/O concurrency number. In some embodiments, the storage system 100 may further wake up the pending access requests in the second RAID. For example, if it is determined by the system that the I/O concurrency number occurring currently of the second RAID (e.g., RAID 112) is less than the concurrency number threshold and the second RAID has a pending access request, the system adds the available I/O concurrency number of the second RAID 112 by the first available I/O concurrency number for supporting concurrent execution of more I/O, and wakes up the pending access request in the second RAID 112 such that each RAID is able to at least support a minimum I/O concurrency number.

If it is determined at 408 that the second RAID meeting such condition is absent in the plurality of RAIDs, the method 400 proceeds to 412, namely, the storage system 100 identifies a third RAID in the plurality of RAIDs, and a number for the pending access requests of the third RAID exceeds a request threshold. At 414, the storage system increases a current available I/O concurrency number of the third RAID by the first I/O concurrency number. In some embodiments, the storage system 100 may also wake up the pending access request in the third RAID. For example, if the storage system 100 determines that the second RAID is absent, it is possible to determine from all RAIDs the third RAID (e.g., RAID 114) having most pending access request, and wake up the pending access request in the third RAID 114, such that the access requests in the RAID with the heaviest load may be preferably executed.

It should be appreciated that although illustration is given by taking RAIDs 110, 112 and 114 as examples in the above different embodiments, in practical use, each of the plurality of RAIDs of the storage system 100 may be identified by a method similar to that in the above embodiments to increase the available I/O concurrency number of the identified RAID, thereby permitting to wake up the pending access requests in the RAID for execution.

Figure 5:
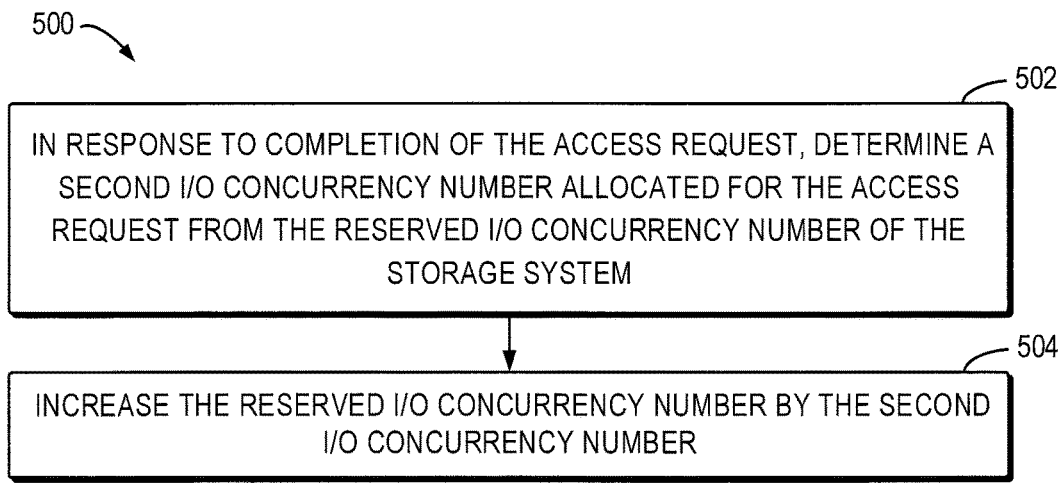
FIG. 5 illustrates a flow chart of a method of releasing input/output (I/O) concurrency number according to other embodiments of the present disclosure.

FIG. 5 illustrates a method 500 of releasing input/output I/O concurrency number according to some other embodiments of the present disclosure. According to the embodiment of the method 500, the portion of reserved I/O concurrency number having been requested by a RAID may be released such that this portion of reserved I/O concurrency number may continue to be requested and used by all RAIDs of the storage system 100. The method 500 may be implemented at the storage system 100, for example, may be implemented by a computing device responsible for system management in the storage system 100. Acts involved in the method 500 will be described in conjunction with the storage system 100 shown in FIG. 1.

At 502, in response to completion of the access request, the storage system 100 determines a second I/O concurrency number allocated for the access request 102 from the reserved I/O concurrency number of the storage system. In some embodiments, when the access request 102 is executed, the storage system 100 may record a portion of fixed I/O concurrency number of the first RAID 110 used by execution of the access request 102 and a portion of reserved I/O concurrency number of the storage system 100. For example, regarding the write access request 102, assuming that one of two I/O concurrency numbers required for execution is from the fixed I/O concurrency number of the first RAID 110 and the other is from the reserved I/O concurrency number of the storage system 100, the second I/O concurrency number is 1. At 504, the storage system 100 increases the reserved I/O concurrency number of the system 100 by the second I/O concurrency number. Therefore, the reserved I/O concurrency number is not persistently occupied by a certain RAID, but reserved for use by a specific RAID in a necessary case.

In this manner, according to an embodiment of the present disclosure, each RAID (e.g., RAIDs 110, 112, 114 and 116) in the storage system 100 may, according to respective access request load situations, apply for the reserved I/O concurrency number of the storage system 100, thereby implementing load balance of the storage system 100. In some embodiments, since the reserved I/O concurrency number of the storage system 100 is limited, it is possible to determine preferentially allocating the reserved I/O concurrency number for which RAID according to the number of pending access requests in each RAID. In some embodiments, it is possible to allocate the reserved I/O concurrency number to a RAID in the storage system 100 having a number of pending access requests exceeding the request threshold. For example, in the example of method 200, assuming that the number of pending access requests in the first RAID 110 exceeds a predetermined request threshold, it is possible to, according to method 300 (FIG. 3), obtain more I/O concurrency number for executing the access request 102. At this time, the access request 102 is a pending access request in the first RAID 110.

In some other embodiments, when none of RAIDs have any pending access requests, as stated above, the reserved I/O concurrency number of the storage system 100 may be allocated to a new access request for any RAID, such that each RAID has an flexible load capability. In the case that the reserved I/O concurrency number is limited, it is possible to determine preferentially allocating the reserved I/O concurrency number for which RAID in a sequential order of new access requests reaching the storage system 100. For example, in the example of method 300 (FIG. 3), assuming that the access request 102 is a new access request of the first RAID 110 and at this time no other RAIDs need to request for the reserved I/O concurrency number or the access request 102 is the earliest access request relative to access request of other RAIDs, the reserved I/O concurrency number may be preferentially allocated for the first RAID 110.

Figure 6:
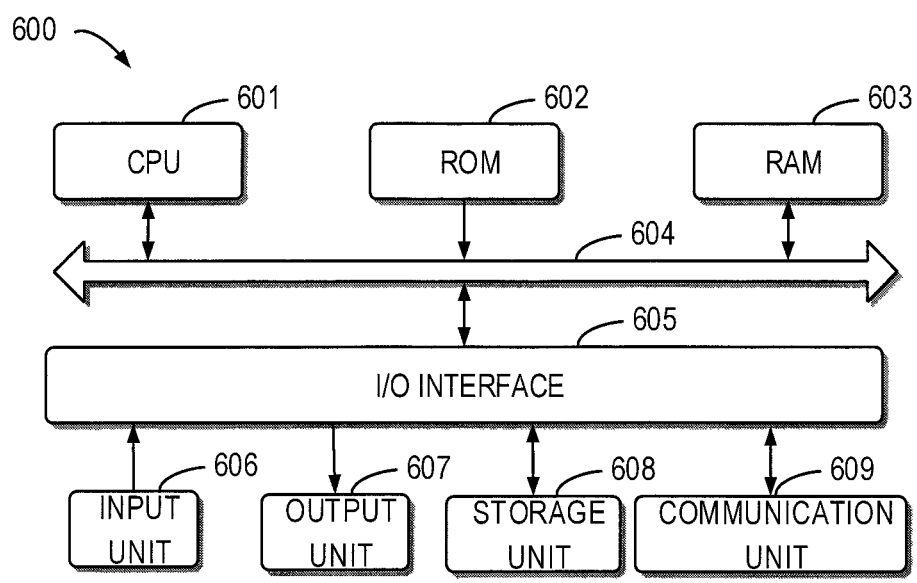
FIG. 6 illustrates a schematic block diagram of an example apparatus that can be used to implement embodiments of the present disclosure.

FIG. 6 is a schematic block diagram of an example apparatus that can be used to implement embodiments of the present disclosure. For example, the computing device for performing management function in FIG. 1 may be implemented by the apparatus 600. As shown in FIG. 6, the apparatus 600 includes a central processing unit (CPU) 601 which is capable of performing various processes in accordance with computer program instructions stored in a read only memory (ROM) 602 or computer program instructions loaded from a storage unit 608 to a random access memory (RAM) 603. In the RAM 603 are stored various programs and data as required by operation of the apparatus 600. The CPU 601, the ROM 602 and the RAM 603 are connected to one another via a bus 604. An input/output (I/O) interface 606 is also connected to the bus 604. In accordance with certain embodiments, other types of computerized equipment/circuitry are used in place of and/or in combination with the computerized circuitry described above.

The following components in the device 600 are connected to the I/O interface 605: an input unit 606 including a keyboard, a mouse, or the like; an output unit 607 such as various types of displays and speakers; the storage unit 608 such as a magnetic disk or optical disk; and a communication unit 609 such as a network card, a modem, a wireless communication transceiver or the like. The communication unit 609 allows the device 600 to exchange information/data with other devices through a computer network such as the Internet and/or various types of telecommunication networks.

The processing unit 601 performs various method and processes described above, for example method 400 and/or method 500. For example, in some embodiments, the method 300, method 400 and/or method 500 may be implemented as a computer software program or computer program product, which is tangibly contained in a machine-readable medium, for example the storage unit 608. In some embodiments, part or all of the computer program may be loaded and/or installed on the device 600 via ROM 602 and/or communication unit 609. When the computer program is loaded in the RAM 603 and executed by CPU 601, one or more acts of the method 300, method 400 and/or method 500 described above may be executed.

The present disclosure may be a method, an apparatus, a system and/or a computer program product. The computer program product may include a computer readable storage medium (or media) having computer readable program instructions thereon for causing a processor to perform aspects of the present disclosure.

The computer readable storage medium may be a tangible device that may retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. Non-exhaustive and more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other electromagnetic waves propagating freely, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processing unit of the computer or other programmable data processing apparatus, create means (or circuitry) for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein has an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

In accordance with certain embodiments, the RAIDs 110, 112, 114, 116 may be viewed as RAID extents. That is, each RAID extent (or simply RAID) is a structure formed by combining storage space from different physical storage devices 122. For example, a first RAID-5 (4+1) extent may include five segments altogether (i.e., five device extents), namely four segments to contain host data and one segment to contain parity from different physical storage devices 122. Furthermore, a second RAID-5 (4+1) extent may include another five segments (four segments to contain host data and one segment to contain parity) where these five segments may or may not share any of the same physical storage devices 122 as the five segments that form the first RAID-5 (4+1) extent.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a storage system, comprising:
    determining an expected input/output (I/O) concurrency number of an access request for a storage system, the access request being associated with a first one of a plurality of redundant arrays of independent disks (RAIDs) comprised in the storage system;
    in response to a current available I/O concurrency number of the first RAID being less than the expected I/O concurrency number, increasing the available I/O concurrency number of the first RAID based on a reserved I/O concurrency number of the storage system; and
    performing the access request using the first RAID having the increased available I/O concurrency number.

2. The method according to claim 1, wherein increasing the available I/O concurrency number of the first RAID comprises:
    comparing the reserved I/O concurrency number with the expected I/O concurrency number;
    in response to determining that the reserved I/O concurrency number is not less than the expected I/O concurrency number, subtracting the expected I/O concurrency number from the reserved I/O concurrency number of the storage system; and
    increasing the available I/O concurrency number of the first RAID by the expected I/O concurrency number.

3. The method according to claim 1, wherein increasing the available I/O concurrency number of the first RAID comprises:
    determining a difference between the expected I/O concurrency number and the available I/O concurrency number of the first RAID;
    comparing the reserved I/O concurrency number of the storage system with the difference;
    in response to determining that the reserved I/O concurrency number of the storage system is not less than the difference, subtracting the difference from the reserved I/O concurrency number of the storage system;
    increasing the available I/O concurrency number of the first RAID by the difference.

4. The method according to claim 1, further comprising:
    determining whether a storage device associated with the access request in the first RAID reaches an I/O concurrency number upper limit;
    in response to determining that the storage device reaches the I/O concurrency number upper limit, suspending the access request; and
    maintaining the available I/O concurrency number of the first RAID.

5. The method according to claim 1, further comprising:
    in response to completion of the access request, determining a sum of an I/O concurrency number allocated from the available I/O concurrency number for access requests occurring currently and a first I/O concurrency number allocated from the available I/O concurrency number for the completed access request;
    comparing the sum with a concurrency number threshold, the concurrency number threshold being at least based on a number of RAIDs in the storage system and a number of storage devices in the storage system;
    in response to the sum being greater than the concurrency number threshold, determining whether a second RAID is present in the plurality of RAIDs, the second RAID having an I/O concurrency number currently occurring therein less than the concurrency number threshold and having a pending access request; and in response to the second RAID being present, increasing the current available I/O concurrency number of the second RAID by the first I/O concurrency number.

6. The method according to claim 5, further comprising:
in response to the second RAID being absent, identifying a third RAID from the plurality of RAIDs, a number of pending access requests of the third RAID exceeding a request threshold; and
increasing a current available I/O concurrency number of the third RAID by the first I/O concurrency number.

7. The method according to claim 5, further comprising:
in response to a change of the number of RAIDs in the storage system, adjusting the concurrency number threshold.

8. The method according to claim 1, further comprising:
in response to completion of the access request, determining a second I/O concurrency number allocated for the access request from the reserved I/O concurrency number of the storage system; and
increasing the reserved I/O concurrency number of the storage system by the second I/O concurrency number.

9. The method according to claim 1, wherein the access request is an access request pending in the first RAID, and the number of access requests pending in the first RAID exceeds a request threshold.

10. An apparatus for managing a storage system, comprising:
at least one processing unit;
at least one memory coupled to the at least one processing unit and storing instructions for execution by the at least one processing unit, the instructions, when executed by the at least one processing unit, causing the apparatus to perform acts comprising:
determining an expected input/output (I/O) concurrency number of an access request for a storage system, the access request being associated with a first one of a plurality of redundant arrays of independent disks (RAIDs) comprised in the storage system,
in response to a current available I/O concurrency number of the first RAID being less than the expected I/O concurrency number, increasing the available I/O concurrency number of the first RAID based on a reserved I/O concurrency number of the storage system, and
performing the access request using the first RAID having the increased available I/O concurrency number.

11. The apparatus according to claim 10, wherein increasing the available I/O concurrency number of the first RAID comprises:
comparing the reserved I/O concurrency number with the expected I/O concurrency number;
in response to determining that the reserved I/O concurrency number is not less than the expected I/O concurrency number, subtracting the expected I/O concurrency number from the reserved I/O concurrency number of the storage system; and
increasing the available I/O concurrency number of the first RAID by the expected I/O concurrency number.

12. The apparatus according to claim 10, wherein increasing the available I/O concurrency number of the first RAID comprises:

determining a difference between the expected I/O concurrency number and the available I/O concurrency number of the first RAID;
comparing the reserved I/O concurrency number of the storage system with the difference;
in response to determining that the reserved I/O concurrency number of the storage system is not less than the difference, subtracting the difference from the reserved I/O concurrency number of the storage system;
increasing the available I/O concurrency number of the first RAID by the difference.

13. The apparatus according to claim 10, wherein the acts further comprise:
determining whether a storage device associated with the access request in the first RAID reaches an I/O concurrency number upper limit;
in response to determining that the storage device reaches the I/O concurrency number upper limit, suspending the access request; and
maintaining the available I/O concurrency number of the first RAID.

14. The apparatus according to claim 10, wherein the acts further comprise:
in response to completion of the access request, determining a sum of an I/O concurrency number allocated from the available I/O concurrency number for access requests occurring currently and a first I/O concurrency number allocated from the I/O concurrency number for the completed access request;
comparing the sum with a concurrency number threshold, the concurrency number threshold being at least based on a number of RAIDs in the storage system and a number of storage devices in the storage system;
in response to the sum being greater than the concurrency number threshold, determining whether a second RAID is present in the plurality of RAIDs, the second RAID having an I/O concurrency number currently occurring therein less than the concurrency number threshold and the second RAID having a pending access request; and
in response to the second RAID being present, increasing the current available I/O concurrency number of the second RAID by the first I/O concurrency number.

15. The apparatus according to claim 14, wherein the acts further comprise:
in response to the second RAID being absent, identifying a third RAID from the plurality of RAIDs, a number of pending access requests of the third RAID exceeding a request threshold; and
increasing a current available I/O concurrency number of the third RAID by the first I/O concurrency number.

16. The apparatus according to claim 14, wherein the acts further comprise:
in response to a change of the number of RAIDs in the storage system, adjusting the concurrency number threshold.

17. The apparatus according to claim 10, wherein the acts further comprise:
in response to completion of the access request, determining a second I/O concurrency number allocated for the access request from the reserved I/O concurrency number of the storage system; and
increasing the reserved I/O concurrency number of the storage system by the second I/O concurrency number.

18. The apparatus according to claim 10, wherein the access request is an access request pending in the first RAID, and the number of access requests pending in the first RAID exceeds a request threshold.

19. A computer program product having a non-transitory computer readable medium which stores a set of instructions to manage a storage system; the set of instructions, when carried out by computerized circuitry, causing the computerized circuitry to perform a method of:
- determining an expected input/output (I/O) concurrency number of an access request for the storage system, the access request being associated with a redundant array of independent disks (RAID) structure of the storage system;
- in response to a current available I/O concurrency number of the RAID structure being less than the expected I/O concurrency number, increasing the available I/O concurrency number of the RAID structure based on a reserved I/O concurrency number of the storage system; and
- performing the access request using the RAID structure having the increased available I/O concurrency number.

20. The computer program product as in claim 19 wherein the RAID structure is a RAID extent residing in a mapped RAID environment, the RAID extent having a set of data segments and a set of parity segments;
- wherein the access request is a write request including host data to be written to the RAID extent; and
- wherein performing the access request using the RAID structure includes:
  - reading original parity from the set of parity segments of the RAID extent,
  - generating new parity based on the original parity and the host data, and
  - writing the host data to the set of data segments of the RAID extent and the new parity to the set of parity segments of the RAID extent.

* * * * *